US012274931B2

(12) United States Patent
Dehouwer

(10) Patent No.: US 12,274,931 B2
(45) Date of Patent: Apr. 15, 2025

(54) DEVICE FOR PRODUCTION OF SETS OF PLAYING CARDS

(71) Applicant: Cartamundi Services NV, Turnhout (BE)

(72) Inventor: Marco Dehouwer, Vosselaar (BE)

(73) Assignee: CARTAMUNDI SERVICES NV, Turnhout (BE)

( * ) Notice: Subject to any disclaimer, the term of this patent is extended or adjusted under 35 U.S.C. 154(b) by 197 days.

(21) Appl. No.: 17/775,102

(22) PCT Filed: Sep. 7, 2021

(86) PCT No.: PCT/EP2021/074588

§ 371 (c)(1),
(2) Date: May 6, 2022

(87) PCT Pub. No.: WO2022/058201

PCT Pub. Date: Mar. 24, 2022

(65) Prior Publication Data

US 2022/0387879 A1 Dec. 8, 2022

(30) Foreign Application Priority Data

Sep. 21, 2020 (EP) .................................... 20197121

(51) Int. Cl.
*A63F 1/12* (2006.01)
*A63F 1/02* (2006.01)
(Continued)

(52) U.S. Cl.
CPC .................. *A63F 1/12* (2013.01); *A63F 1/02* (2013.01); *A63F 2001/022* (2013.01);
(Continued)

(58) Field of Classification Search
CPC ....... B07C 5/3412; B07C 5/342; B07C 5/362; A63F 1/02; A63F 2001/022; A63F 2250/58; B41J 3/407; B41J 11/66
See application file for complete search history.

(56) References Cited

U.S. PATENT DOCUMENTS 3,804,242 A * 4/1974 Tall ...................... B07C 5/3412 209/3.3
5,199,710 A 4/1993 Lamle
(Continued)

FOREIGN PATENT DOCUMENTS

CN 1531703 A 9/2004
CN 101172273 A 5/2008
CN 101500665 A 8/2009

OTHER PUBLICATIONS

Search Report from corresponding European Application No. 20197121.5, Mar. 1, 2021.

(Continued)

*Primary Examiner* — Joseph C Rodriguez
(74) *Attorney, Agent, or Firm* — Workman Nydegger

(57) ABSTRACT

A device for production of sets of playing cards is provided, and includes: a printing means for printing randomly ordered playing cards; an identification means to identify one or more defective playing cards, having a feedback unit to instruct the printing means to reprint the defective playing cards; and an evacuation means to evacuate the one or more defective playing cards.

9 Claims, 7 Drawing Sheets

(51) Int. Cl.
*B41J 3/407* (2006.01)
*B41J 11/66* (2006.01)

(52) U.S. Cl.
CPC ........... *A63F 2250/58* (2013.01); *B41J 3/407* (2013.01); *B41J 11/66* (2013.01)

(56) References Cited

U.S. PATENT DOCUMENTS

| | | | | |
|---|---|---|---|---|
| 6,403,908 | B2 * | 6/2002 | Stardust | A63F 1/14 209/939 |
| 9,254,435 | B2 | 2/2016 | Miller et al. | |
| 11,898,837 | B2 * | 2/2024 | Krenn | G01N 21/55 |
| 2001/0054576 | A1 | 12/2001 | Stardust et al. | |
| 2002/0155869 | A1 | 10/2002 | Soltys et al. | |
| 2002/0187821 | A1 | 12/2002 | Soltys et al. | |
| 2008/0001356 | A1 | 1/2008 | Franks | |
| 2008/0150231 | A1 | 6/2008 | Moody | |
| 2009/0088237 | A1 | 4/2009 | Hsu | |
| 2016/0263469 | A1 * | 9/2016 | Shigeta | A63F 1/10 |
| 2017/0036471 | A1 * | 2/2017 | Biffert | B41J 3/407 |

OTHER PUBLICATIONS

International Search Report from PCT Application No. PCT/EP2021/074588, Jan. 5, 2022.

Translation of Chinese Office Action from Corresponding Chinese Patent Application No. CN2021800079469, Jun. 13, 2024.

* cited by examiner

DEVICE FOR PRODUCTION OF SETS OF PLAYING CARDS

FIELD OF THE INVENTION

The present invention relates to devices for production of sets of playing cards, as well as methods for device for production of sets of playing cards.

BACKGROUND OF THE INVENTION

Card playing games are well known nowadays. Often the game is based upon the unpredictability of the order of cards being dealt or drawn from a randomly ordered deck or set of playing cards, wherein a set of playing cards comprises more than one deck of playing cards being randomly ordered at set level.

As an example, baccarat is played with a randomly ordered set of 8 decks of playing cards, in total 416 randomly ordered cards. For some games, once cards are drawn from the set, the drawn cards cannot be used anymore as such, since the order of drawing and setting aside the drawn cards can be monitored. Players can turn the cards themselves after the bet resulting in compromised, damaged or destroyed cards Reusing the used cards may be open for prediction or order, hence of cheating.

Seen the high stakes involved, in fact any source of fraudulent playing or behaviour must be avoided. The handling time between production of a set of playing cards and using it at the playing table needs to be as little as possible to avoid to large extent the possibility for fraudulent actions.

SUMMARY OF THE INVENTION

It is an object of the present invention to provide a device and a method which is able to print a randomly ordered set of playing cards. An advantage of some embodiments of the device and method is that the device and method reduce the amount of waste during production of the sets of playing cards. Some embodiments may allow reuse of playing cards already drawn from a set of playing cards. Further, some embodiments of the device provide a relatively small dimension to the device, making it possible to place the device in a small production hall or office of the casino or playing hall.

According to a first aspect of the invention, a device for production of sets of playing cards is provided. The device comprises

- A printing means for printing randomly ordered playing cards;
- An identification means to identify one or more defective playing cards, comprising a feedback unit to instruct said printing means to reprint the defective playing cards;
- An evacuation means to evacuate the one or more defective playing cards.

The printing means may be instructed to consecutively print sets of randomly ordered playing cards, each set comprising a given number of decks of cards. The printing means may print these sets as groups of a given number of playing cards, e.g. a matrix of x by y playing cards. The feedback unit may instruct the printing means to add the defective playing cards in the next set or the next group of cards to be printed.

A set of playing cards means a number of decks of playing cards. A randomly ordered sets of playing cards means that the cards of all the decks are in random order in the set, also referred to as shuffled set of playing cards. A deck of cards comprises thirteen cards (ace, King, Queen, Jack, and 10 to 2) of four suits (hearts, spades, clubs and diamonds). Possibly a set of playing cards further comprises other playing cards which play a role in the game to be played, like baccarat, blackjack, Poker, Pontoon, Si Ki Pi, etc.

Each set may comprise a plurality of decks, such as 1 to 10 decks, e.g. 1, 2, 3, 4, 5, 6, 7, 8, 9 or 10 decks.

To avoid fraudulent actions, the lead time between production of cards and the cards being played in a casino is kept as short as possible, both in time and place. Therefore, the device according to the invention is preferably located in the a small production hall or office of the casino, although the device may be located in card production facilities as well.

The printing means prints one set of printing cards one after the other. The printing means will include a randomizer, to define a random sequence of the playing cards in each set of playing cards to be printed. The randomization may be done on set-level, i.e. randomization of the cards of the given number of decks in the set.

The device according to the invention comprises an identification means to identify defective playing cards. Cards can be defective because of e.g. a defective or incorrect cutting, a printing defect, like ink marks or use of insufficient or an excess of ink, or because of a defect in the paper or cardboard used. Hence a quality check includes a check on the print on the card, a check for paper or cardboard defects and a quality check on the cutting operation may be appropriate. These checks may be done by one operational step or may be split into two separate quality checks, hence two separate means, i.e. one for checking paper/cardboard and printing defects, and one for cutting defects.

The identification means identifies at least the defectively printed playing cards and the paper and/or cardboard defects. If a cutting operation is to follow the printing operation or printing means, the identification means may identify defectively cut playing cards as well. Hence defective playing cards is to be understood as cards being defectively printed and/or including a paper/cardboard defect and optionally also cards which are defectively cut, or cards which both are defectively printed or with paper/cardboard defects and defectively cut.

The printing means prints the face sides of the playing cards, revealing rank and suit of the playing cards. The backside of the card may be provided with a decorative outlook. The printing means may print the face side on a blank card of sheet or tape of paper or cardboard, being provided at its backside with the decorative outlook.

However, starting from blank cards, tape, or sheets of paper or cardboard at both sides of the card, sheet or tape of paper or cardboard, and during printing, the playing cards may also be printed on the backside, giving the cards backside a decorative outlook. The identification means may identify cards which are defectively printed at least at the front or face side (revealing rank and suit), but possibly also defectively printed at the backside as well.

The feedback unit instructs the printing means to add additional cards being identical in ranks and suits to the one or more defectively printed playing cards in the sets of playing cards being or to be printed. The identification means may be positioned after a cutting means to cut the cards from a larger sheet or tape of paper or cardboard and may be used to identify defectively cut playing cards. The feedback unit can instruct the printing means to add additional cards being identical in ranks and suits to the one or more defectively cut playing cards in the sets of playing cards being or to be printed.

According to some embodiments, the printing means may be a digital printer.

Though other printing techniques should not be excluded, the playing cards are preferably printed by a digital printer. The digital printer has a randomization unit which defines, from a set of cards comprising a given number of decks and possibly other playing cards, a random sequence for printing the playing cards.

The printing means prints the playing cards. The printing means may print the cards in series one by one on pre-cut blank cards. The defectively cut blank cards may already be removed from the stack used for printing.

According to some embodiments, the device further may comprise a stacking means to stack the printed playing cards into a plurality of stacks of playing cards.

According to some embodiments, the printing means may print sheets of playing cards, each sheet comprises a matrix of playing cards.

The printing means may print playing cards one by one, or may print playing cards on a sheet or roll of paper or cardboard, such that the playing cards are positioned as a matrix on the roll or sheet of paper or cardboard. This matrix can be a matrix with only one row; hence the printing device prints a tape of paper or cardboard, on which the cards are printed in sequence and from which the cards need to be cut. Alternatively, the printing device may print sheets of playing cards, on which the playing cards are distributed in a matrix of two or more rows and two or more columns. As a mere, example, a printing device may print sheets of playing cards on which a matrix of 7 by 8 or 8 by 7 playing cards are depicted.

In both cases, the playing cards needs to be individualized from the tape or sheet of paper or cardboard.

According to some embodiments, the device may comprise a cutting means to cut individual playing cards from a tape or sheet of printed paper or cardboard, depicting the printed playing cards.

Preferably this is done by means of a known playing card cutting machine, such as a cutter, a slitting machine, a die-cutter or a puncher.

The identification means may be positioned after the cutting means, and may be used to identify, and provide feedback to the printing means on defectively cut playing cards. The feedback unit may instruct the printing means to add additional cards being identical in ranks and suits to the one or more defectively cut playing cards in the sets of playing cards being or to be printed.

Alternatively, the cutting means has a quality checking means identifying defectively cut cards (like improper edges or presence of brims, non-rectangular cut cards, etc.). This quality check means may be part of the identification means or may work as a separate means. Optionally this quality check means may provide feedback to the printing means on defectively cut playing cards. It may instruct the printing means to add additional cards being identical in ranks and suits to the one or more defectively cut playing cards in the groups of cards printed, e.g. a decks, being or to be printed. It may as well remove the defectively cut cards, or the whole group, e.g. the whole deck to which the defectively cut cards belong, from the production process. For this it may have an own removing means to remove at least the defectively cut cards. If the whole group, e.g. the whole deck of playing cards is removed, feedback to the printing means to reprint each of the cards in the group, e.g. deck, may be given.

Optionally, the device may comprise a coating means, e.g. a varnish unit, providing a resin of lacquer coating on at least the front side of the playing cards.

This varnish unit may e.g. be positioned prior to the identification means.

According to some embodiments, the device may comprise a card arranging means to arrange playing cards in a train of playing cards.

The playing cards, once optionally individualized from a tape or sheet of paper or cardboard, may be put one after the other in a train of playing cards. Preferably the cards do not overlap but are ordered edge by edge. The playing cards may be moved on a flat belt or by means of a roller chain or conveyor belt As will be set out more extensively further, the print may include a visible or non-visible card identification (also referred to as card identity or card identity string) which is different from the rank and suit, and which even may be a unique card identification or card identity or card identity string. It may be printed using invisible ink, such as UV reflective inks providing a visible image when illuminated with appropriate UV light. The check for printing defects may include checking for presence and correctness of this card identification. The identification means may, for this reason, include a UV light source for illumination of the cards with UV light.

Often, the printing device of the printing means will include an own quality check for checking printing defects and paper or cardboard defects. As such the identification means may comprise this print quality checking device. It may optionally comprise a first camera.

So, according to some embodiments, the identification means may comprise a first camera.

This first camera inspects playing cards on printing and paper or cardboard defects, and optionally on cutting defects as well. The first camera is preferably positioned after a card train is formed.

As said, the printing device of the printing means may also perform a playing card inspection for printing and paper or cardboard defects. The feedback unit of the identification means will gather information on the defective cards, optionally by combining the information from the camera and the printing device itself, and will give a feedback signal back to the printing means which cards are defective and need to be reprinted. It may provide as feedback the rank and suit of the defective card, or if a card identity is printed, it may give the card identity along with the rank and suit, or the card identity only as feedback to the printing means.

As such, the printing device gets to know which card (rank and suit or rank and suit and card identity) needs to be reprinted. The printing device, which itself defines the random sequence of cards to be printed, will add and include the card to be reprinted in one of its next printing actions.

The printing means may add the card to be reprinted in the sequence of cards it is presently printing, or may add it to the next set of playing cards for which it needs to make up the random sequence or the playing cards present in the set of playing cards.

Once the defective cards are identified, and feedback to the printing means is given, the defective cards need to be taken out of the series of cards. This may be done by means of an evacuation means.

This evacuation means may be a discrete means or may be part of the stacking means.

The evacuation system as a discrete means may get information of the cards to be evacuated. This may be information from the identification device on the number of cards between the identification means and the evacuation position in the evacuation means. The evacuation means counts the cards and evacuate the card after it has counted the given number of cards. The defective playing cards can be passed to a waste basket collecting the defective playing cards.

Alternatively, when the cards have a unique card identification or card identity, the evacuation means may get the card identity of the card to be evacuated and may evacuate the card once the card identity is detected. For this detection, it may comprise a second camera, optionally with a suitable light source such as a UV light source.

Optionally the evacuation system is a part of the card stacking means, where the defective cards are "stacked" in a waste basket.

The playing cards, optionally offered as a train of cards, need to be stacked into complete sets of cards.

According to some embodiments, the stacking means may include

- A plurality of card stacking baskets;
- A distributing unit to distribute said identified playing cards to one of the card stacking baskets;
- A counting unit for counting per suit and rank the playing cards deposited in each of the card stacking baskets;
- A removal unit to remove complete sets of the card stacking baskets.

This stacking means may be present in the device according to the invention.

Possibly the stacking means comprises a recognition unit to identify suit and rank of a playing card;

Possibly, the recognition unit may comprise a further, third camera.

By means of this further camera, the rank and suit of a card passing the camera is identified. The stacking means now compares the rank and suit of the card passing the camera, with the lists of cards present in each basket it has. It defines in which basket the card needs to be added and instructs the distributing unit accordingly.

In case the evacuation means is integrated in the stacking means, the stacking means will notice the card passing to be defective and will instruct its distribution unit to drop the card in a waste basket. When cameras are used, the second and third camera may be the same camera.

As such, the complete set of playing cards will be reunited. Assume for a given set of cards, one card was defective and hence evacuated and reprinted. The non-defective cards of this set will be stacked in one of the baskets, hereafter called first basket, until the last playing card of this printed set is added to the basket. The counting unit now has information that all cards are present, except one or more cards, each from a given rank and suit, which were the defective cards. Unless the next card is identical to a defective card, the next cards passing the recognition unit will not be added to this first basket, as the number of these cards with this rank and suit are complete. The next cards will be added to the next basket. The next card with the given rank and suit of a defective card will be added to the set in the first basket, which was almost complete, in order to complete this set. This is done until the set in the first basket is complete. This complete set can now be removed from the first basket. The reprinted card will cause the next set of cards still to be complete, unless this next set of cards also has one or more defective cards. The approved cards of this set will be stacked in the appropriate basket, but at the end, again some cards with given rank and suit may be missing. Again, a further basket starts to be filled with the following set of cards, while the basket missing some cards await the missing cards which will be taken from the next set. This loop continues, resulting in complete sets being taken from the baskets.

As such the amount of waste cards is limited to only the defective cards.

If the playing cards are given a unique identity, the detection of the defective cards, either by the camera of the stacking means or a camera present in the evacuation means, is facilitated more easily. The camera just must check for the card identity which was coded defective by the identification means. When the card with this identity is detected, the card needs to be evacuated, optionally by stacking it into the waste basket.

According to some embodiments, each card stacking basket may be provided with a further camera, this camera identifies playing card being added to the stack of playing cards in said basket.

This further, possibly fourth, camera is used to keep track of the content of the basket. The identifying can be just reading rank and suit of the cards with are added to this basket, or, if unique card identities are printed on each card, may include reading the identity of the cards being added. A list of read card identities, or just a counting of card's rank and suit can be made and stored on a memory. This counting is a doublecheck of the number and kind of cards being stored in each basket. To doublecheck whether all cards of the set of cards are present when the set of cards is evacuated from the basket. The list of cards, or even the list and sequence of card's rank and suit, or the list or sequence of card identities in the set may be stored on an appropriate data storage means. This information may accompany the set of playing cards in order to allow later check of presence and sequence of cards being dealt. The set of playing cards may as well be provided with a given, optionally unique, set identity, allowing the set to be monitored and followed in its further path to the casino table and back.

In alternative embodiments each card stacking basket is provided with a sensor, these sensors identify which playing card being added to the stack of playing cards in which of said baskets. The sensors may obtain their input from the identification or evacuation means.

In order to control all information streams, the device according to the invention may comprise a processing unit to process all information and data generated.

The processing unit may generate the random sequence of playing cards to be printed by the printing device. The processing unit may generate the individual card identities to be printed for each card. The processing unit may process the information on defective cards provided by the identification unit and optionally by the printing means. The processing unit may instruct the printing means on the cards to be reprinted. The processing unit may process the instructions for the evacuation means. The processing unit may process the information of recognition unit, may determine in which basket the recognised card or card identity is to be stacked, may control the distribution unit and alike. The processing unit may count the cards per card value (rank and suit) being stacked in each of the baskets and may define the basket in which a given card is to be stacked.

The device according to the invention has the advantage that the device may recuperate undealt cards from sets of cards which have been subject of dealing at a card playing table. Also dealt but undamaged cards may be recuperated in the same way. Sets of cards, with a number of cards not having been dealt, may return to the hall or office of the casino where sets of cards are prepared and/or distributed from. As the sequence of the undealt cards has not been subject to any exposure to the outside world, these cards may be recuperated, provided the sets of cards into which they are recuperated, have an identical outlook.

According to some embodiments, the device may comprise a card recuperation means.

This recuperation means is preferably located in a position where the recuperated cards can be integrated in a card train being made. Preferably the recuperation means is located before the identification means. Optionally, the card recuperation means has an identification means, identifying rank and suit of a recuperated card. This information can be forwarded to the printing means, where in a next set of playing cards to be printed, one card with this rank and suit will not be printed, hence omitted.

As already mentioned, the playing cards may be provided with a card identity, possibly a unique card identity.

Unique here means that it is unlikely that a card with an identical card identity is present in the process at that moment, or in a given time period thereafter, e.g. in the 6 months following the time moment the card identity is first used. The unique card identity may be a serial number of a given string of characters, optionally a binary string of 0 and 1. In case the playing cards are printed on a sheet as a matrix of n by m cards, the unique card identity can be composed of a sheet serial number and a position number linking the card to its position in the matrix. As a preferred embodiment, the sheet serial number can be a string of more than 5, e.g. 6 to 12 characters 0 to 9, (e.g. 6, 7, 8, 9, 10, 11 or 12 characters) and the position number can be a decimal figure between zero and n times m, n and m are the rows and columns in the matrix. Alternatively the sheet serial number can be a string of more than 20, e.g. 20 to 28 digits, i.e. 0 or 1, such as a string of 20, 21, 22, 23, 24, 25, 26, 27 or 28 digits, and the position number can be a binary number between zero and n times m, n and m are the rows and columns in the matrix. The card identity can be printed as a QR code, a barcode, an OCR, a data matrix or any type of vision code.

The card identity may be a unique card identity. A unique card identity does not refer to strict uniqueness but must be understood in the context of the invention, i.e. playing cards used in card games, such as in casinos. An identity is unique if it is infeasible to find a second playing card having an identical card identity. One could say that a card identity is unique if the possibility that a second playing card with the same card identity is found, is 1/100.000 or less, such as 1/1.000.000 or less, e.g. 1/10.000.000 or less.

This unique identity, preferably unreadable with the naked eye and present one or more times on the face side of the playing card, can be used to identify the card as a card which is allowed to be present at a given place and time. As an example, the set of playing cards in which a card with given card identity is present, can be located in a given card dealing system (like a shoe of a dealing system).

This card identity can be used in the production method, to monitor the movement of the playing card with the given identity, and to build up lists and sequences of card identities in the baskets in which set of playing cards are stacked.

According to a second aspect of the invention, a device for production of sets of playing cards is provided, wherein the device comprises a digital printer for printing playing cards of a set of playing cards.

According to a third aspect of the invention, a method to produce sets of playing cards is provided.

According to some embodiments, the method to produce sets of playing cards comprises the steps of printing playing cards using a digital printer.

According to some embodiments, the playing cards may be printed in random order.

According to some embodiments, said method may comprise:

A. Printing randomly ordered sets of playing cards;
B. Identify defective playing cards;
C. Instruct the digital printer to add defective cards in the randomly ordered set of playing cards being or to be printed;
D. Evacuate defective playing cards from the printed playing cards.

According to some embodiments, the method may further comprise the steps of

E. Stack the printed playing cards into a plurality of stacks of printed cards using a stacking device, for each playing card
  Identify said playing card;
  Find the stack which is lacking said identified printed playing card and add the identified printed playing card to said stack;
until one of the stacks is a complete set of cards;
F. Evacuate said complete set of cards from the stacking device.

According to some embodiments, the steps A to F may be taken by a device according to the first aspect of the invention.

According to some embodiments, the method further may comprise:

providing playing cards recuperated from a dealt set of playing cards;
Identify said recuperated playing cards;
Instruct the printing device to remove cards with the identity of the recuperated playing cards from the randomly ordered set of playing cards being or to be printed;
Add the recuperated cards to the printed playing cards.

According to some embodiments, the playing cards may be provided with a unique card identity, the identification of playing cards is done by reading said unique card identities.

According to a fourth aspect of the invention, the use of a device according to the first aspect of the invention is provided, for providing set of playing cards.

The very same device and method can be used to produce cards different from playing cards. Cards used in a board or other game, or collectable cards may be made by means of the same device and/or method.

Hence according to a fifth aspect of the invention, a method to produce game cards is provided, the method comprising the steps of printing game cards using a digital printer.

According to a sixth aspect of the invention, a device for production of game cards is provided, the device comprising A printing means for printing randomly ordered game cards;
An identification means to identify one or more defective game cards, comprising a feedback unit to instruct said printing means to reprint the defective game cards;
An evacuation means to evacuate the one or more defective game cards;
A stacking means to stack the printed game cards into a plurality of stacks of game cards.

It is evident that game cards or collectable cards can be playing cards in this fifth and sixth aspect of the invention. In general, features of one aspect of the invention can be combined with features of another aspect of the invention, unless such combination would not be technically feasible. According to a seventh independent aspect of the invention, a playing card is provided.

A playing card according to this seventh aspect is provided with a unique and detectable card identity. Optionally, playing card according to this seventh aspect is provided with a unique and detectable card identity code, the code being an encryption of a card identity.

A unique card identity does not refer to strict uniqueness but must be understood in the context of the invention, i.e. playing cards used in card games, such as in casinos. An identity is unique if it is infeasible to find a second playing card having an identical card identity. One could say that a card identity is unique if the possibility that a second playing card with the same card identity is found, is 1/100.000 or less, such as 1/1.000.000 or less, e.g. 1/10.000000 or less.

This very low risk on finding an identical card identity is sufficient to see the card identity as unique, since in casinos and gambling houses and alike, the life span of a set of cards is quite short, which further limits the risk of having two cards with identical card identities at the same time in the building. In casinos and gambling houses and alike, cards are typically used only once, after which they are destroyed. The time span between a card being produced and destroyed after use is typical in the range some weeks.

The unique card identity may be converted into a card identity code, e.g. a barcode or QR code or alike, and this card identity or card identity code is detectable. Detectable card identities or codes mean that the card identity or code can be detected by a detection unit which might be present in a device in which the card is located, e.g. a container of a cartridge for holding playing cards, or in a shoe in which a set of cards or a cartridge comprising a set of cards is to be placed. The detection unit can extract the card identity form the detected card identity code, if such code is used. Card identity is a string of numbers, figures, characters and alike who together form the card identity. It may as well be a string of 0 and 1, i.e. a binary data string.

The detectable card identity or code may be readable, meaning that a simple detecting unit can read out the card identity or code. as said, the detected card identity may be an encrypted code or image based upon the card identity, being the card identity code. From this card identity code, the card identity can again be read or extracted, such as calculated or extracted using decryption. This card identity may be used to compare it with data, stored on a data storage unit, which data comprises a.o. the card identity or a list of card identities which cards are present in a given set of cards.

The playing card may be a card being fit for playing card games, like Baccarat and blackjack.

A playing card may be a playing card comprising a face side and a back side, said face side being provided with an image of rank and suit, the playing card being provided with a unique and detectable, such as readable, card identity, different from this rank and suit.

According to some embodiments, the playing card may be a playing card from a deck of playing cards.

A deck of cards refers to the 52 different playing cards that are used in a traditional card game. It comprises four groups of 13 cards, the four suits being spade, heart, diamond and club. Each group of 13 cards comprises an Ace, Jack, Queen, King and 9 cards numbered 2 to 10, called rank of the card.

According to some embodiments, the detectable card identity or card identity code may be provided on the face side of the playing cards.

The face side of a card is the side revealing the rank and suit of the card, and is opposite to the backside of the card. Preferably the detectable card identity does not interfere with the imprint of rank and suit, also visible on the face side of the playing card.

Optionally the card identity or card identity code is present on the card several times on different locations along the face of the card. The card identity may be printed as a card identity code, in this case being an image representation of the card identity.

According to some embodiments, the detectable card identity or card identity code may be invisible for the eye.

The card identity or code might not be visible by the naked eye. The card identity or code may be visible, hence detectable, by UV illumination only, or by radiation with non-visible light of a given wavelength or wavelength range. UV illumination sources, such as LED UV illumination may be used to make the card identity or code readable using an appropriate camera system.

According to some embodiments, the detectable card identity code may be a barcode, a QR code or a snap tag, a binary code or a set of characters and/or figures.

Characters are to be understood as characters chosen from the alphabet, the figures 0 to 9, punctuation marks and special characters like &, @, #, §, $, £, €, any other ASCII character and alike.

According to some embodiments, the detectable card identity code may be printed using micro-dot encryption. The use of micro-dots to identify the rank and suit of cards of a card on the face side of a card known from U.S. Pat. No. 9,254,435.

According to some embodiments, the detectable card identity code may be the result of encrypting card identity, said card identity comprising at least one of a serial number or a randomly generated number.

According to embodiments, the card identities are the result of encrypting card information comprising one or more of Rank Suit Date of printing the card Time of printing the card Company printing the card The brand of the card Etc.

together with at least one of a serial number or at least randomly generated number.

The card identity may be a string of characters, figures and symbols, or may be present as a more complex encrypted type of card identity code such as a bar code or a QR code. The card identity can be based upon information on rank and suit of the card, the date and/or time of printing of the card, the place and machine printing the card, the unique serial number of the card printed on said machine, the casino name for which the card is printed and/or used, the manufacturer of the card, the brand name, the table where the card will be used, and many more. The card may be part of a set of cards which is to be inserted in a container of a cartridge. Each set of cards and/or each cartridge may have a unique serial number or an own set and/or cartridge identity, and the card identity of the cards in the set and/or the cartridge may contain information on this set and/or cartridge number or identity.

Possibly the card identity cannot be linked with, hence is independent from, the rank and suit of the playing card. Alternatively the card identity data comprises a card type code, being a series of characters and/or numbers which is based upon the rank and suit of the card and which characters and/or numbers are encrypted using a given, first key to provide an encrypted string of figures and/or numbers. To this card type code, a randomly generated number or a serial number of 3 or more figures may be added. This combination of string of figures and/or numbers and the randomly generated or serial number, together forming the card identity data, may on its turn be encrypted using a second key or alike to provide the card identity.

Possibly the card identity may comprise information on the printed sheet of playing cards from which the playing card was part of. It may comprise information on the printed sheet serial number and eht position where this card was present on the sheet, e.g. as an indication of the position of the card in a matrix of cards being printed on the sheet.

According to an eighth aspect of the invention, a set of playing cards is provided. In the set of playing cards, each of said playing cards being provided with a unique and detectable card identity or card identity code.

in the set of playing cards, each of the playing cards may be a playing card according to the seventh aspect of the invention.

A set of playing cards may be a set wherein said playing cards comprising a face side and a back side, said face side being provided with an image of a rank and suit, said playing card being provided with a unique and detectable, such as readable, card identity or card identity code, different from said rank and suit.

The cards in the set of cards are preferably randomized, meaning that the cards present in the set, may be shuffled, and have a sequence which is not ordered in an organised way in view of rank and/or suit of the cards.

Preferably the set of playing cards comprise one or more than one decks of cards, such as 2, 3, 4, 5, 6, 7, 8, 9, 10, 11 or 12 decks. Most preferred, the set of cards comprises 6, 8 or 10 decks, as e.g. is used for playing Baccarat.

Next to the playing cards, the set of cards may comprise other cards, necessary to play a game of cards. Also these other cards may comprise a card identity or card identity code similar to the one of the playing cards.

According to some embodiments, the playing cards may be present in a randomized order.

According to some embodiments, the card identity or card identity code may be provided on the face side of the playing cards.

According to some embodiments, the card identity or card identity code may be invisible for the eye.

According to some embodiments, the card identity code may be a barcode, a QR code, a snap tag, a binary code or a set of characters and/or figures. According to some embodiments, the card identity code may be printed using micro-dot encryption.

According to some embodiments, the set may comprise one or more decks of playing cards, preferably 2 to 10 decks.

According to embodiments, the card identities codes are the result of encrypting card information such as one or more of Rank
Suit
Date of printing the card
Time of printing the card
Company printing the card
Set identity for which the card will be part of,
brand of the card
etc.

together with at least one of a serial number or at least randomly generated number.

A set of cards may be provided with a set identity and optionally a set identity code, being an encryption of the set identity. According to some embodiments, the set identity code may be a barcode, a QR code, a snap tag, a binary code or a set of characters and/or figures. The set identity or set identity code may accompany the set of playing cards. It may be a code printed on the package of the set of cards or may be printed or present on the seal of such package. The set identity may comprise information on the cards and their card identities, which cards are present in the set. According to embodiments, the set identity is the accumulation of the card identities present in the set. Optionally the set identity is the accumulation of the card identities present in the set, which card identities are present in the sequence identical to the sequence of cards in the set.

According to embodiments, the set identity is the accumulation of parts of the card identities present in the set. Optionally the set identity is the accumulation of parts of the card identities present in the set, which parts of card identities are present in the sequence identical to the sequence of cards in the set. When the card identity is a string of M characters, figures and symbols, the parts of the card identities may be one to R of these M characters, figures and symbols which are present on given positions in the string of M characters, figures and symbols, where R<=M.

This set identity, optionally after decryption of the set identity code, comprising information on the cards present in the set, may be used to check to what extent fraudulent actions might have taken place with the set of cards. When a card was slipped into the set of cards, reading the card identity (optionally via decryption of the card identity code) and comparing this to the set identity, may reveal that this card was not part of the original set of cards. If the set identity comprise information on the sequence of cards in the set of cards, reading the card identity (optionally via decryption of the card identity code) and comparing this to the set identity may reveal that the card has changed position in the set of cards. All this may be pointers to possible fraudulent actions having taken place.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The same reference signs refer to the same, similar or analogous elements in the different figures.

DESCRIPTION OF ILLUSTRATIVE EMBODIMENTS

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

Figure 1:
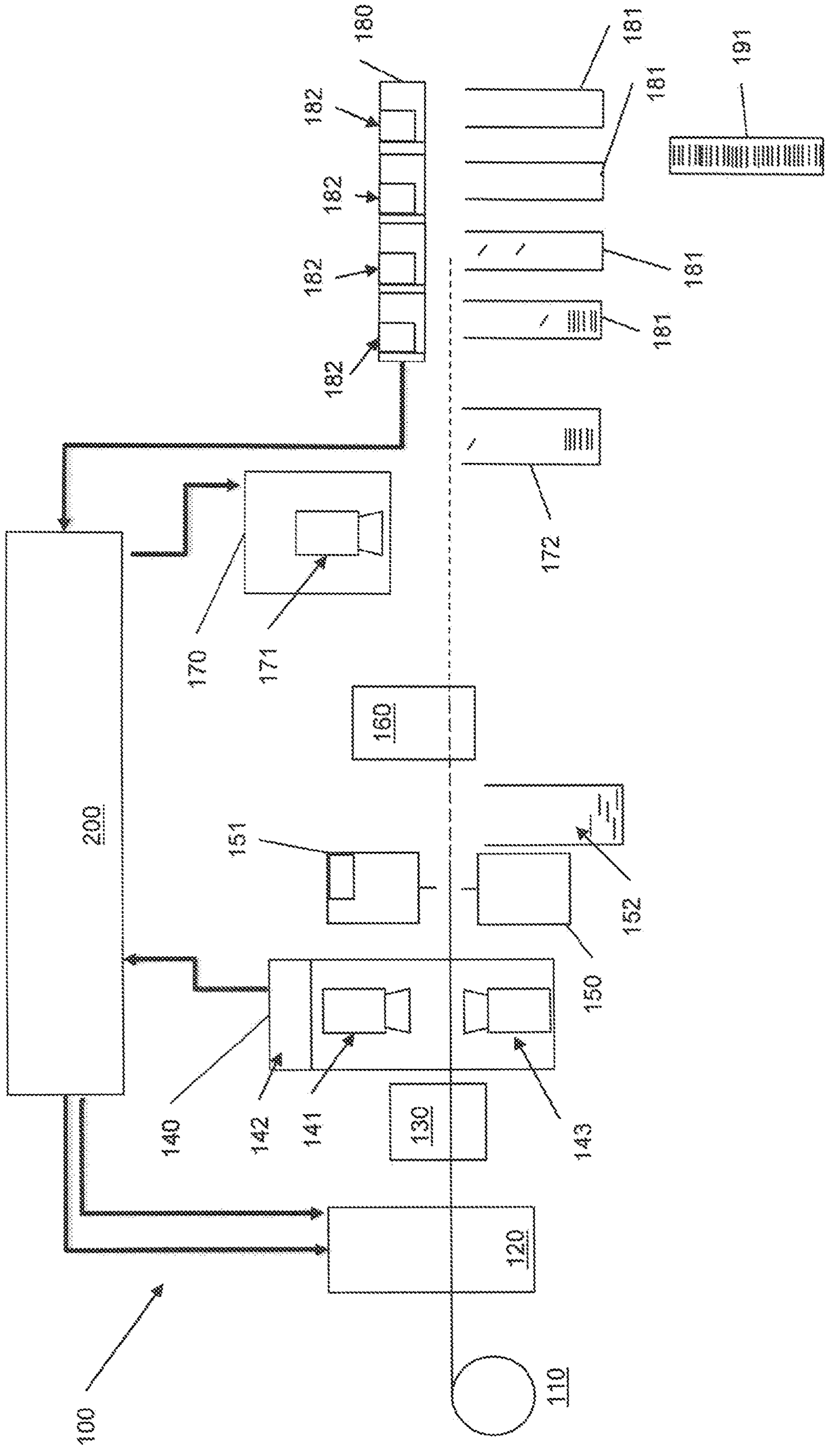
FIGS. 1 to 5 are is schematically views of device for production of sets of playing cards according to the invention.

A device 100 for production of sets of playing cards is shown in FIG. 1. The device comprises a paper supply 110, in this case a roll of paper sheet. The roll is unrolled, and one end is provided to a printing means, being a digital printing apparatus 120 for printing randomly ordered sets of playing cards. Alternatively, sheets of paper can be supplied to the printing means instead of a roll of paper sheet. Groups of cards, here a matrix of 8 by 7 cards, i.e. 56 cards are printed. Each card is provided with a unique card identification or identity, as an example in form of a barcode. Alternatively, the card identity can be provided as an QR code, an OCR, a data matrix or any type of vision code. This code can be converted, using appropriate algorithms, into a number with 9 figures. The first 7 figures represent a number being the sheet number, e.g. the serial number of the sheet being printed during the course of the year, starting with 0000001 and ending 9999999. The last 2 figures provide a number between 1 and 56, representing the position of the card on the sheet being printed. The paper sheet is thereafter varnished in varnishing means 130. An identification means 140 is thereafter to identify one or more defective playing cards. Defects may be paper defects or printing defects, e.g. an excess of shortage of ink used, misplacement of the image on the card, visual defects in cardboard, etc. For this purpose, the identification means comprises a camera 141, and means to compare the image taken with the expected image. A second camara 143 is provided to inspect the backside of the cards. If the image does not match within the accepted tolerances, the feedback unit 142 instructs the printing means 120, via a processing unit 200 to add the detected defective card to the group of cards, or to the set of cards, which is to be printed next. The unique identity of the defective playing card is stored in the memory of the processing unit 200. Though not shown in FIG. 1, the identification means 140 may also check the backside of the cards for defects and will identify a card as defective if a defect is noticed on the backside.

By cutting means 150, the sheet of paper on which the matrix of printed playing cards is depicted, is cut into individual playing cards. The cut quality is checked by quality check means 151. If the cut is not performed according to the standards, the cut group of cards is removed to a waste bin 152. The cards are thereafter organized as a train of cards by a means 160.

The cards are now scanned by evacuation means 170, comprising a camera 171. If the card identity of the card passing the evacuation means matches with a card identity stored in the memory of the processing unit, the card with this card identity is diverted into a waste bin 172. The remaining cards, of which the camera of the evacuation means 170 has read the rank and suit, are now stacked by a stacking means 180 into a series of stacking baskets 181. For each basket, a camera 182 identifies the rank, suit and card identity, which information is sent to the processing unit 200. As such record is kept of the number of cards per rank and suit which are sent to a basket 181. If a set of cards in a basket 181 is complete, the complete set is removed from the basket by a removing means 191. The processing unit 200 has for this set of cards the content and the sequence of the card identities. When the set if given an identity, the set identity and the data on the content can be kept together. The data on the sequence of cards can be used to verify the sequence of cards when the set is used during playing of the game, e.g. by reading the card identities when being drawn from the shoe in which the set is located. If the sequence read does not match the sequence of the data, likely some erroneous action of fraud has been taken place.

Figure 2:
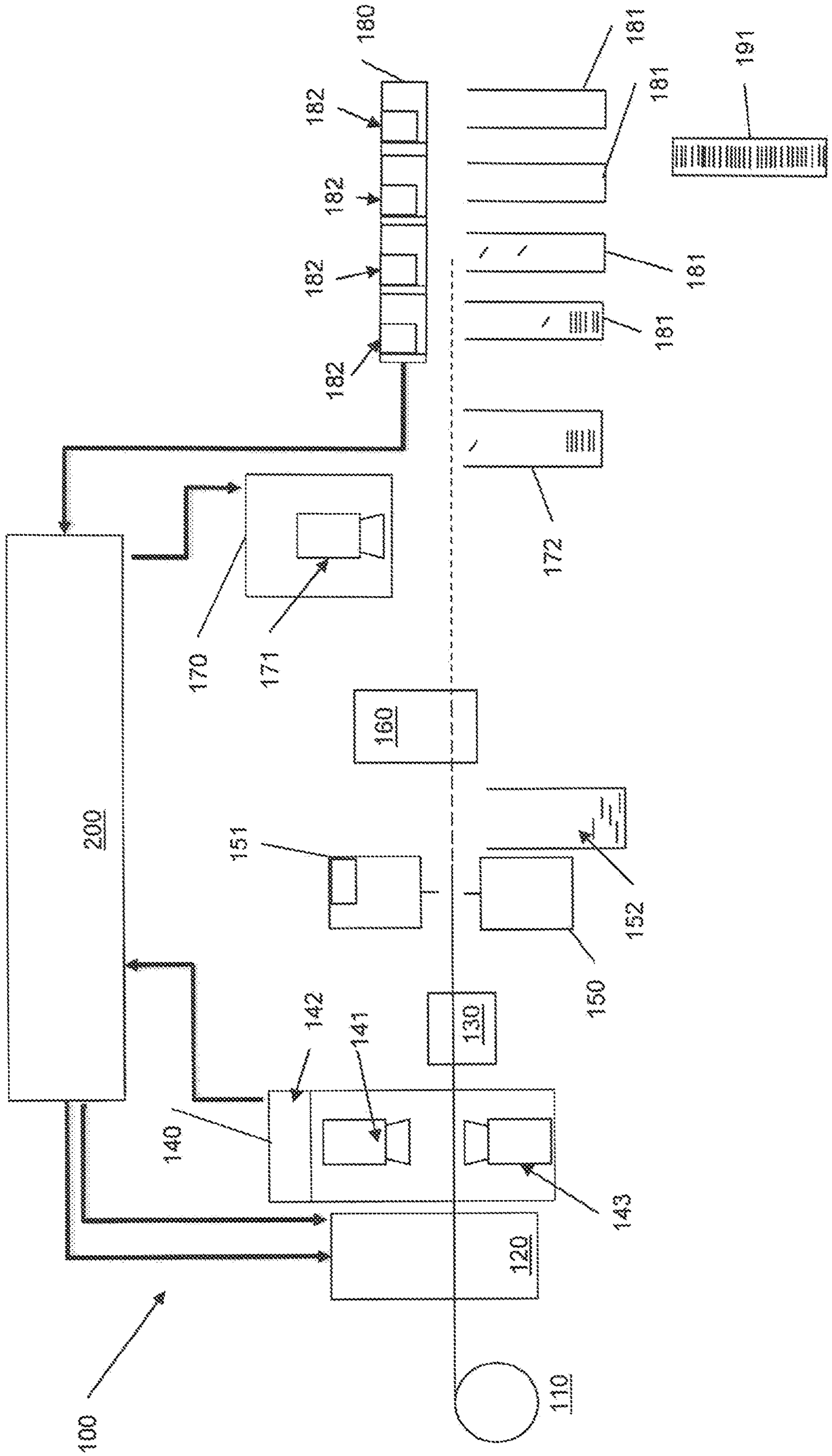

As an alternative in FIG. 2, in device 101, the identification means 140 is integrated in the printing means, and the defective playing cards are detected and identified prior to the varnishing means.

It is possible that this process is a continuous process, though an interruption of the continuous flow can be made by stacking the sheets after the cutting means 150, where the roll is cut into sheets. A further cutting means to cut each sheet into cards may be provided, including a quality check means for this second cutting operation.

Though shown in FIGS. 1 and 2 as a separate means, the evacuation means 170 and the stacking means 180 may form one device, where one of the baskets 181 functions as the waste bin 172.

In this device 101 and 100, as well as in the alternative devices, to deviate the direction of a card in the process, it may be advantageous to use air pressure, air guidance or air pressure guidance to deviate the direction of the moving card.

The card identity can be printed using UV visible ink. If this is the case, all cameras are further provided with a UV illumination source.

Figure 3:
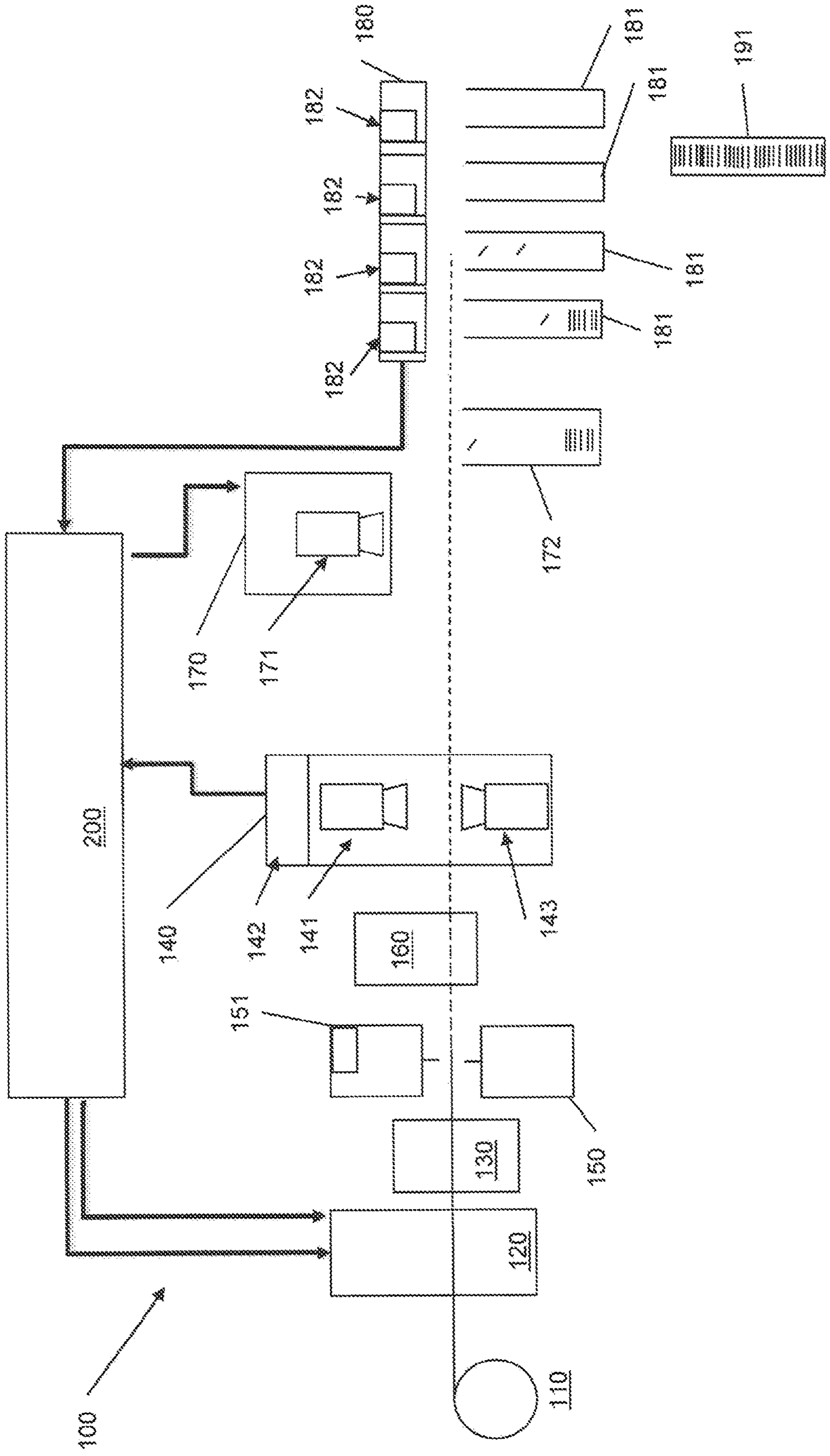

An alternative device 102 for production of sets of playing cards is shown in FIG. 3. The device comprises a paper supply 110, in this case a roll of paper sheet. The roll is unrolled, and one end is provided to a printing means, being a digital printing apparatus 120 for printing randomly ordered sets of playing cards. Groups of cards, here a matrix of 8 by 7 cards, i.e. 56 cards are printed. Identically as for the method and device shown in FIG. 1, each card is provided with the unique card identification or identity, as an example in form of a barcode. The paper sheet is thereafter varnished in varnishing means 130.

By cutting means 150, the sheet of paper on which the matrix of printed playing cards is depicted, is cut into individual playing cards. The cards are thereafter organized as a train of cards by means 160.

An identification means 140 is thereafter to identify one or more defective playing cards. Defects may be paper defects or printing defects, e.g. an excess of shortage of ink used, misplacement of the image on the card, visual defects in the paper or cardboard, etc., as well as cutting defects. For this purpose, the identification means comprises a camera 141, a second camara 143 to inspect the backside of the cards, and means to compare the image taken with the expected image. If the image does not match within the accepted tolerances, the feedback unit 142 instructs the printing means 120, via a processing unit 200 to add the detected defective card to the group of cards, or to the set of cards, which is to be printed next. The unique identity of the defective playing card is stored in the memory of the processing unit 200.

The cards are now scanned by evacuation means 170, comprising a camera 171. If the card identity of the card passing the evacuation means matches with a card identity stored in the memory of the processing unit, the card with this card identity is diverted into a waste bin 172. The remaining cards, of which the camera of the evacuation means 170 has read the rank and suit, are now stacked by a stacking means 180 into a series of stacking baskets 181. For each basket, a camera 182 identifies the rank, suit and card identity, which information is sent to the processing unit 200. As such record is kept of the number of cards per rank and suit which are sent to a basket 181. If a set of cards in a basket 181 is complete, the complete set is removed from the basket by a removing means 191. The processing unit 200 has for this set of cards the content and the sequence of the card identities. When the set if given an identity, the set identity and the data on the content can be kept together. The data on the sequence of cards can be used to verify the sequence of cards when the set is used during playing of the game, e.g. by reading the card identities when being drawn from the shoe in which the set is located. If the sequence read does not match the sequence of the data, likely some erroneous action of fraud has been taken place.

Though shown in FIG. 3 as a separate means, the evacuation means 170 and the stacking means 180 may form one device, where one of the baskets 181 functions as the waste bin 172.

As an alternative, the identification means, and the evacuation means may use the same camera.

Figure 4:
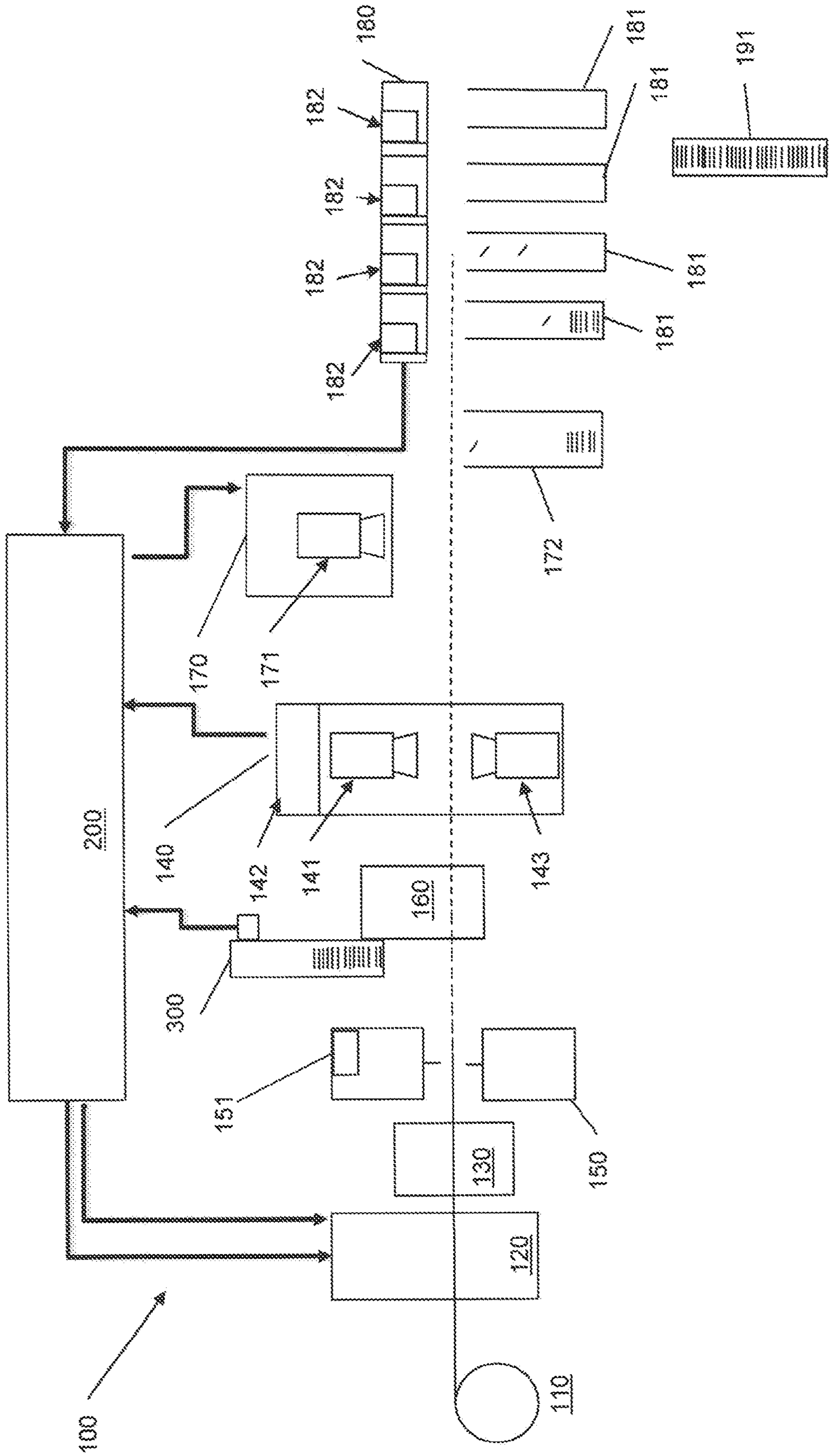

Still another alternative device 103 for production of sets of playing cards is shown in FIG. 4. The device comprises a paper supply 110, in this case a roll of paper sheet. The roll is unrolled, and one end is provided to a printing means, being a digital printing apparatus 120 for printing randomly ordered sets of playing cards. Groups of cards, here a matrix of 8 by 7 cards, i.e. 56 cards are printed. Identically as for the method and device shown in FIG. 1, each card is provided with a unique card identification or identity, as an example in form of a barcode. The paper sheet is thereafter varnished in varnishing means 130.

By cutting means 150, the sheet of paper on which the matrix of printed playing cards is depicted, is cut into individual playing cards. The cards are thereafter organized as a train of cards by means 160. By means of a reclaiming means, reclaimed cards, preferably cards of sets which were used, and most preferably the cards which remained undealt from these sets, are stacked in the reclaiming means 300. These reclaimed cards, also carrying a card identity, are added to the newly printed flow of playing cards. The rank and suit of the reclaimed cards may be provided to the processing unit 200, which may instruct the printing means to omit the printing of the reclaimed cards.

An identification means 140 is thereafter to identify one or more defective playing cards. Defects may be paper defects or printing defects, e.g. an excess of shortage of ink used, misplacement of the image on the card, etc., as well as cutting defect or damage to reclaimed cards. For this purpose, the identification means comprises a camera 141, a second camara 143 to inspect the backside of the cards, and means to compare the image taken with the expected image. If the image does not match within the accepted tolerances, the feedback unit 142 instructs the printing means 120, via a processing unit 200 to add the detected defective card to the group of cards, or to the set of cards, which is to be printed next. The unique identity of the defective playing card is stored in the memory of the processing unit 200.

The cards are now scanned by evacuation means 170, comprising a camera 171. If the card identity of the card passing the evacuation means matches with a card identity stored in the memory of the processing unit, the card with this card identity is diverted into a waste bin 172. The remaining cards, of which the camera of the evacuation means 170 has read the rank and suit, are now stacked by a stacking means 180 into a series of stacking baskets 181. For each basket, a camera 182 identifies the rank, suit and card identity, which information is sent to the processing unit 200. As such record is kept of the number of cards per rank and suit which are sent to a basket 181. If a set of cards in a basket 181 is complete, the complete set is removed from the basket by a removing means 191. The processing unit 200 has for this set of cards the content and the sequence of the card identities. When the set if given an identity, the set identity and the data on the content can be kept together. The data on the sequence of cards can be used to verify the sequence of cards when the set is used during playing of the game, e.g. by reading the card identities when being drawn from the shoe in which the set is located. If the sequence read does not match the sequence of the data, likely some erroneous action of fraud has been taken place.

Though shown in FIG. 4 as a separate means, the evacuation means 170 and the stacking means 180 may form one device, where one of the baskets 181 functions as the waste bin 172.

As an alternative, the identification means, and the evacuation means may use the same camera.

Figure 5:
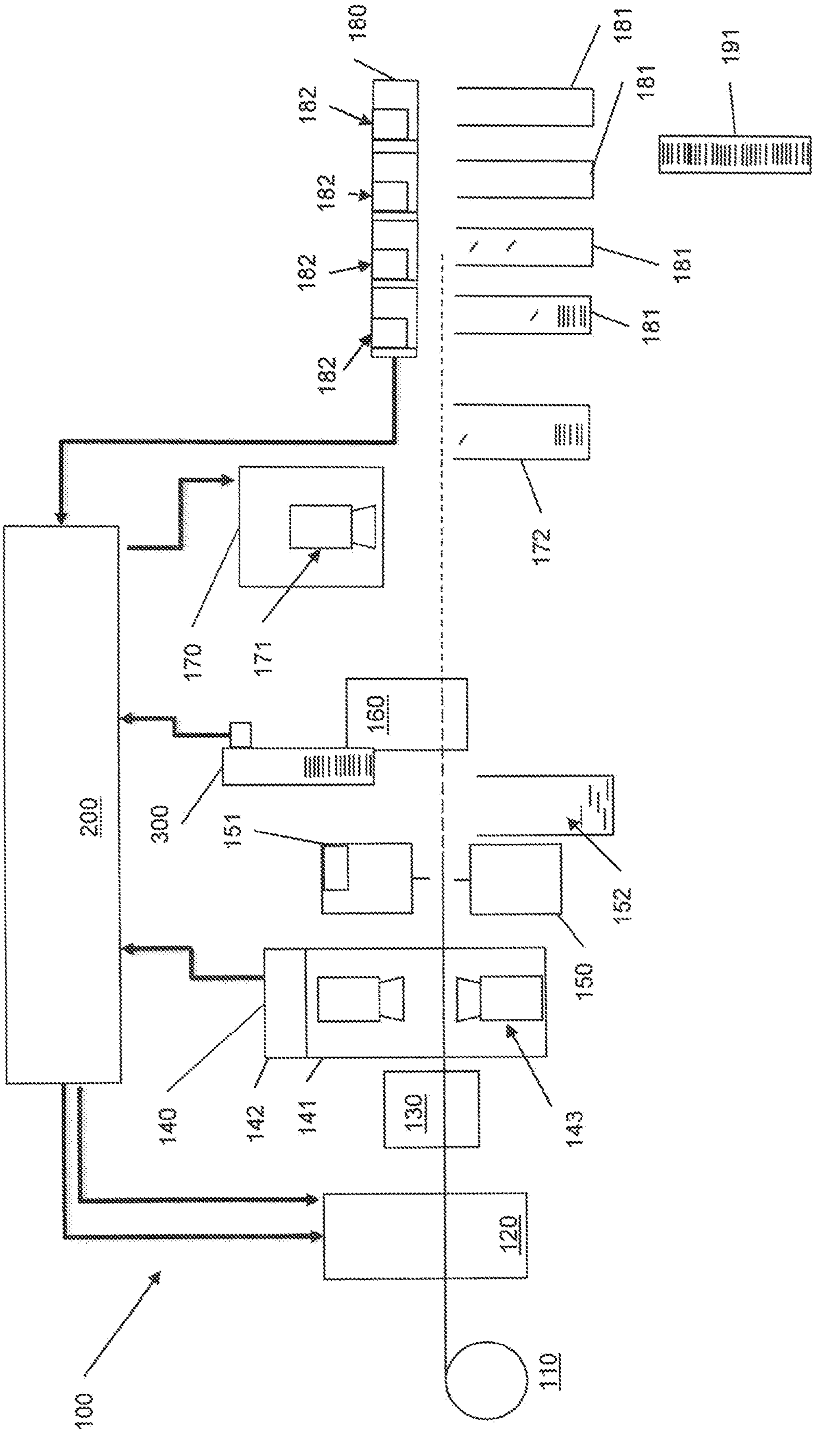

As a further alternative, a process as shown in FIG. 5 can be provided, where a reclaiming means 300 identical as the one shown in FIG. 4, is positioned before the evacuation means 170, optionally also before the means 160 to make a card train. As the reclaimed cards typically are cards being never dealt or handled, no check for defects is strictly necessary. Hence new sets of cards can be composed using stacking means 180 by providing reclaimed cards using a reclaiming means 300, identifying the cards using the evacuation means 170, and sorting the reclaimed cards by the stacking means 180. New sets of cards can be composed using reclaimed cards only.

As a further alternative for the devices shown in FIGS. 1 to 5, the cameras 182 may be replaced by sensors. The camera 141 or 171 may provide input to the sensors as to which card needs to be directed to which basket. The sensors check if the right card passes into the right basket. If a card is wrongly direct, the device may be set on hold.

Figure 6:
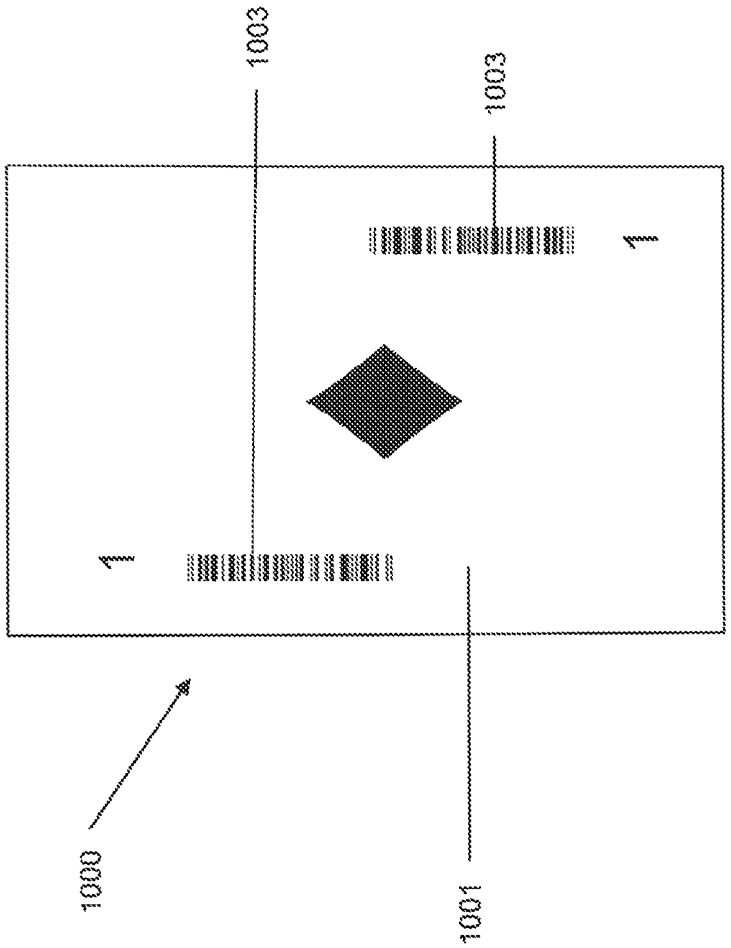
FIG. 6 illustrates a laying card according to the first aspect of the invention.

A playing card 1000 according to the seventh aspect of the present invention is schematically shown in FIG. 6. The playing card, in this case the ace of diamonds, comprises the information on rank and suit on its face side 1001. Next to the rank and suit, the card 1000 further has a card identity code 1003 on its face side 1001, in this case being a barcode-like image. This card identity is imprinted with UV visible ink. With the naked eye, this card identity 1003, will not be visible.

Figure 7:
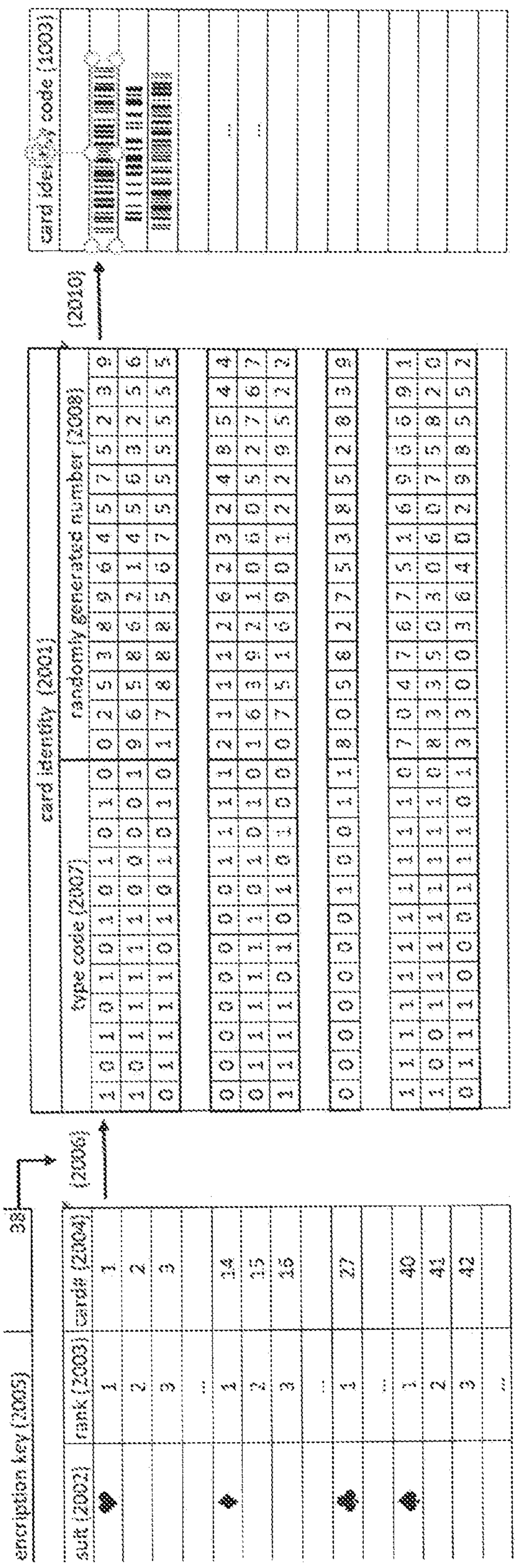
FIG. 7 illustrates a scheme to develop a card identity for a group of cards

As demonstrated in FIG. 7, the card identity code 1003 is an image representation of the card identity 2001. Encryption and possible encryption software (2010) will convert the card identity 2001 into the image of the card identity 1003, here a barcode-like image, this image being the card identity code 1003. When the card identity code 1003 is detected, suitable decoding software can convert the card identity code 1003 back into the card identity 2001.

An example how a card identity can be obtained, is shown in FIG. 6. Each card has its rank (2002) and suit (2003). This defines a card number (2004), being a number between 0 and 52. Possible other playing cards, necessary to play a given card game, may also be present in a set of playing cards. Such other cards are given a further card number, like 53, 54, etc.

By means of an encryption key (2005) and encryption software (2006), this card number is converted in a card type code (2007) being e.g. a series of zero and one using a bijective function. Hence this card type code (2007) is a binary string of data. This card type code is not unique, as all playing cards with the same rank and suit in a set of playing cards comprising more than one deck, will have the same card identity code.

To this card type code (2007) a randomly generated number (2008) of 14 figures (of 0 to 9) is added. The combination of the card type code and randomly generated FIG. 2008) together form the card identity (2001). This card identity data (2001) is detected, read out and fed to an encryption software (2010), using a bijective function to convert the card identity (2001) into the card identity code (1003). In this particular embodiment a bar code reading device is fit to read the card identity. It is understood that this device uses UV light to render the barcode "visible" for the bar code reading device.

These card identity 2001 and card identity code 1003 are unique. The risk that a second identical card with given suit and rank will have the same card identity 103, is 1015, or one too a trillion. The string of characters and numbers itself, being the card identity 2001, can be used as unique card identity. To detect and read the card identity data being used as card identity, a camera system and image analysis software may be used. It is understood that this camera system uses UV light to render the barcode "visible" for the bar code reading device.

It is to be understood that although preferred embodiments and/or materials have been discussed for providing embodiments according to the present invention, various modifications or changes may be made without departing from the scope and spirit of this invention.

The invention claimed is:

1. A device for production of sets of playing cards, the device comprising:
   - a printing means for printing randomly ordered sets of playing cards;
   - an identification means to identify one or more defective playing cards, comprising a feedback unit to instruct said printing means to reprint the defective playing cards as part of the randomly ordered set of playing cards being or to be printed;
   - an evacuation means to evacuate the one or more defective playing cards; and
   - a stacking means to stack the printed playing cards into a plurality of stacks of playing cards, wherein the stacking means includes:
     - a plurality of card stacking baskets;
     - a distributing unit to distribute said identified playing cards to one of the card stacking baskets;
     - a counting unit for counting per suit and rank the playing cards deposited in each of the card stacking baskets; and
     - a removal unit to remove complete sets of the card stacking baskets.

2. The device according to claim 1, wherein the device comprises a cutting means to cut individual playing cards from a tape or sheet of printed paper or cardboard, depicting the printed playing cards.

3. The device according to claim 1, wherein the device comprises a card arranging means to arrange playing cards in a train of playing cards.

4. The device according to claim 1, wherein the device comprises a card recuperation means.

5. The device according to claim 1, wherein the printing means is a digital printer.

6. A method to produce sets of playing cards comprising the steps of printing playing cards using a digital printer, wherein said method comprises:
   - (A) printing randomly ordered sets of playing cards, wherein the playing cards are printed in random order;
   - (B) identifying defective playing cards;
   - (C) instructing the digital printer to add defective cards in the randomly ordered set of playing cards being or to be printed;
   - (D) evacuating defective playing cards from the printed playing cards;
   - (E) stacking the printed playing cards into a plurality stacks of printed cards using stacking means, the stacking means including:
     - a plurality of card stacking baskets;
     - a distributing unit distributing said identified playing cards to one of the card stacking baskets;
     - a counting unit counting per suit and rank the playing cards deposited in each of the card stacking baskets; and
     - a removal unit removing complete sets of the card stacking baskets;
   - (F) evacuating a complete set of cards from the stacking means using the removal unit of the stacking means.

7. The method according to claim 6, wherein the steps A to F are taken by a device for production of sets of playing cards, the device comprising:
   - a printing means for printing randomly ordered playing cards;
   - an identification means to identify one or more defective playing cards, comprising a feedback unit to instruct said printing means to reprint the defective playing cards;
   - an evacuation means to evacuate the one or more defective playing cards.

8. The method according to claim 6, wherein the method further comprises:
   - providing playing cards recuperated from a dealt set of playing cards;
   - identifying said recuperated playing cards;
   - instructing the printing device to remove cards with the identity of the recuperated playing cards from the randomly ordered set of playing cards being or to be printed;
   - adding the recuperated cards to the printed playing cards.

9. The method according to claim 6, wherein the playing cards are provided with a unique card identity, and the identification of playing cards is done by reading said unique card identities.

* * * * *